US012279289B2

(12) United States Patent
Kannan et al.

(10) Patent No.: US 12,279,289 B2
(45) Date of Patent: Apr. 15, 2025

(54) TECHNIQUES FOR IMPROVING SCHEDULING REQUEST TRANSMISSION IN WIRELESS COMMUNICATIONS

(71) Applicant: QUALCOMM Incorporated, San Diego, CA (US)

(72) Inventors: Naresh Kannan, Trichy (IN); Avinash Kumar Dubey, Hyderabad (IN); Raghuveer Ramakrishna Srinivas Tarimala, Hyderabad (IN); Sivashankar Sekar, Hyderabad (IN); Narukula Rajesh, Hyderabad (IN); Manjunath Bavalatti, Rampur Rabkavi (IN)

(73) Assignee: QUALCOMM Incorporated, San Diego, CA (US)

( * ) Notice: Subject to any disclaimer, the term of this patent is extended or adjusted under 35 U.S.C. 154(b) by 341 days.

(21) Appl. No.: 17/743,104

(22) Filed: May 12, 2022

(65) Prior Publication Data

US 2023/0371053 A1 Nov. 16, 2023

(51) Int. Cl.
*H04W 72/52* (2023.01)
*H04W 28/02* (2009.01)
*H04W 72/21* (2023.01)
*H04W 72/23* (2023.01)
*H04W 74/0833* (2024.01)

(52) U.S. Cl.
CPC ....... *H04W 72/52* (2023.01); *H04W 28/0278* (2013.01); *H04W 72/21* (2023.01); *H04W 72/23* (2023.01); *H04W 74/0833* (2013.01)

(58) Field of Classification Search
CPC . H04W 72/52; H04W 28/0278; H04W 72/21; H04W 72/23; H04W 74/0833; H04W 72/1221
See application file for complete search history.

(56) References Cited

U.S. PATENT DOCUMENTS

| | | | |
|---|---|---|---|
| 2009/0092202 A1* | 4/2009 | Kim | H04W 28/0205 375/295 |
| 2010/0271990 A1* | 10/2010 | Leelahakriengkrai | H04W 28/0278 370/310 |
| 2018/0263032 A1* | 9/2018 | Terry | H04W 72/21 |
| 2020/0059959 A1* | 2/2020 | Turtinen | H04W 74/006 |
| 2020/0120660 A1* | 4/2020 | Wang | H04W 72/563 |
| 2021/0037413 A1* | 2/2021 | Babaei | H04W 28/0278 |
| 2021/0352717 A1* | 11/2021 | Lee | H04W 76/19 |

(Continued)

FOREIGN PATENT DOCUMENTS

EP 2449844 B1 11/2012

OTHER PUBLICATIONS

International Search Report and Written Opinion—PCT/US2023/063238—ISA/EPO—May 30, 2023.

*Primary Examiner* — Sudesh M Patidar
(74) *Attorney, Agent, or Firm* — Arent Fox, LLP and Qualcomm, Incorporated

(57) ABSTRACT

Aspects described herein relate to transmitting a scheduling request (SR) for an uplink grant based at least in part on presence of data in a buffer, wherein the SR is scheduled for transmission according to a SR periodicity, and aborting, based at least in part on expiration of a discard timer corresponding to the buffer and/or the buffer being empty, at least a next SR that is scheduled for transmission according to the SR periodicity.

30 Claims, 8 Drawing Sheets

(56) References Cited

U.S. PATENT DOCUMENTS

| | | | |
|---|---|---|---|
| 2022/0104280 A1* | 3/2022 | Yang | H04W 74/0841 |
| 2022/0217743 A1* | 7/2022 | Zhou | H04W 76/14 |
| 2022/0224393 A1* | 7/2022 | Gao | H04W 76/19 |
| 2022/0322459 A1* | 10/2022 | Zhou | H04W 72/21 |
| 2024/0090014 A1* | 3/2024 | Loehr | H04W 72/56 |

* cited by examiner

TECHNIQUES FOR IMPROVING SCHEDULING REQUEST TRANSMISSION IN WIRELESS COMMUNICATIONS

BACKGROUND

Aspects of the present disclosure relate generally to wireless communication systems, and more particularly, to transmitting scheduling requests (SRs).

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

In some wireless communication technologies, such as 5G NR, devices, including user equipment (UE), can transmit an SR to a network node to request scheduling of resources for transmitting data to the network node. The UE can initiate an SR procedure to transmit multiple SRs to the network node over a period of time in case an initial SR transmission is not received or otherwise fails at the network node. In 5G NR, the SR procedure can include parameters such as a SR periodicity defining a periodicity for transmitting the SRs, a SR prohibit timer defining a period of time after transmitting a SR within which another SR may not be transmitted, or a maximum transmission count defining a maximum number of SRs that can be transmitted as part of the SR procedure.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an aspect, a method of wireless communication is provided that includes transmitting a scheduling request (SR) for an uplink grant based at least in part on presence of data in a buffer, wherein the SR is scheduled for transmission according to a SR periodicity, and aborting, based at least in part on expiration of a discard timer corresponding to the buffer, at least a next SR that is scheduled for transmission according to the SR periodicity.

In a further example, an apparatus for wireless communication is provided that includes a transceiver, a memory configured to store instructions, and one or more processors communicatively coupled with the transceiver and the memory. The one or more processors are configured to execute the instructions to perform the operations of methods described herein. In another aspect, an apparatus for wireless communication is provided that includes means for performing the operations of methods described herein. In yet another aspect, a computer-readable medium is provided including code executable by one or more processors to perform the operations of methods described herein.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
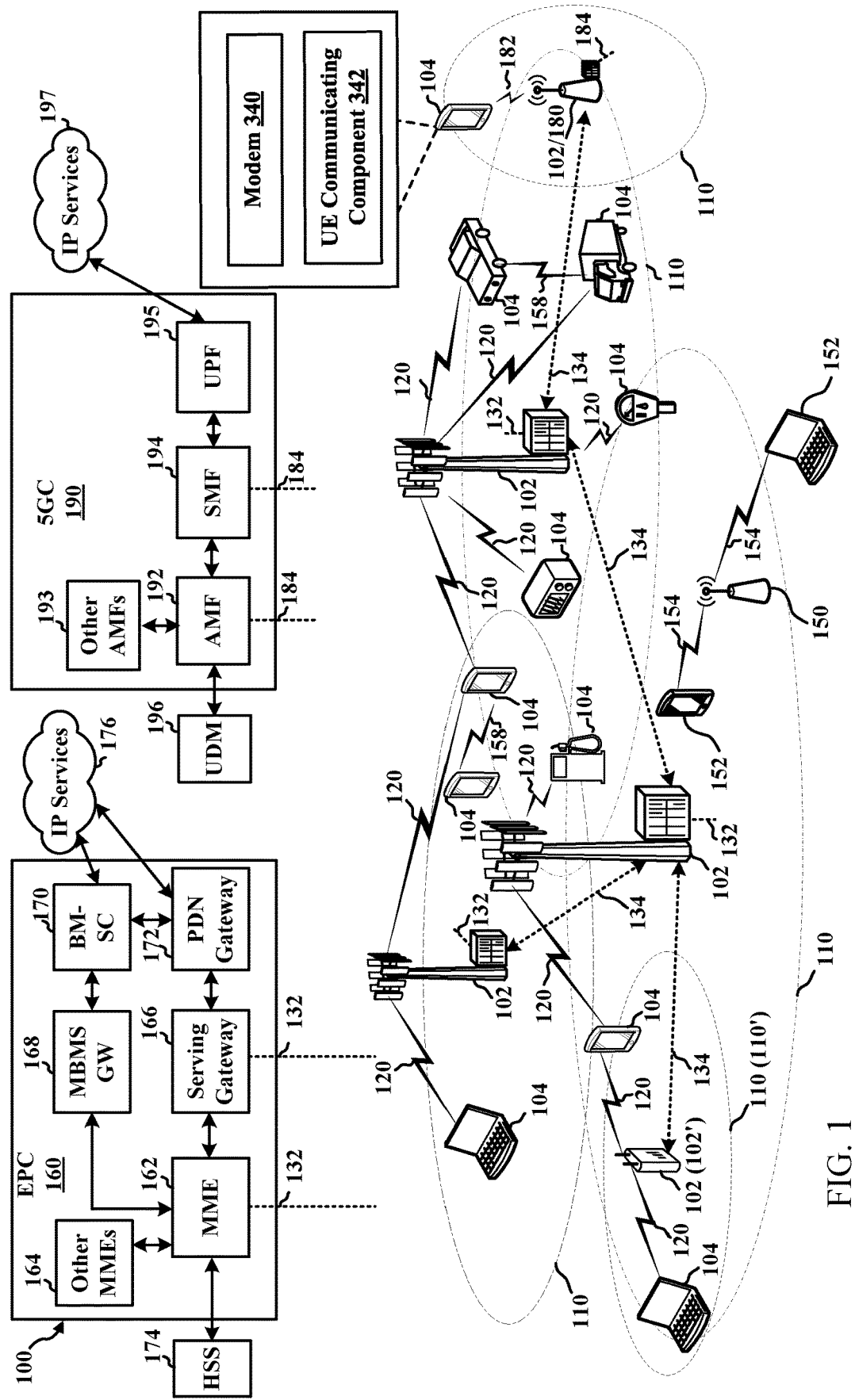
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects.

It may be evident, however, that such aspect(s) may be practiced without these specific details.

The described features generally relate to improving SR procedures to avoid transmitting SRs where a device does not have data to transmit. For example, it may be possible that a device transmitting SRs in a SR procedure may expire data from a buffer before a uplink (UL) grant is received, at which point the device may not use the UL grant, if eventually received. For instance, where a media access control (MAC) buffer is empty, the device may obtain an uplink packet from an upper layer for transmitting to a network node. The device may start a discard timer (e.g., a DiscardTimer configured by the network) for that packet. To get the uplink (UL) grant, the device can transmit SR. In some cases, such as cell edge scenario or where the network is providing UL grant with delay, the device can attempt for multiple SR transmissions in the SR procedure. The device may perform the SR procedure by transmitting multiple SR requests based on the SR periodicity of the SR procedure, the SR-ProhibitTimer, and/or the dsr-TransMax count. If the network has configured a lower DiscardTimer for the device to discard data from the buffer, then it is possible that the discard timer expires and buffer becomes empty before receiving the UL grant from the network, as it is the only pending data available in buffer.

Conventionally, in 5G NR (e.g., per third generation partnership project (3GPP) technical specification (TS) 38.331), when a user equipment (UE) starts transmitting SR, it can be cancelled only after the reception of UL grant or after the number of SR transmissions without receiving a UL grant reaches dsr-TransMax count. In this regard, even after MAC buffer becomes empty, the UE can continue SR transmission until UL grant received or it reaches dsr-TransMax count. When dsr-TransMax count is reached, the UE can release the physical uplink control channel (PUCCH) resources, over which SR is transmitted, and trigger a random access channel (RACH) procedure to establish a connection with the network node or another network node. One specific example of such a configuration may include a SR configuration where SR periodicity is 80 millisecond (ms), sr-ProhibitTimer is 3, sr-TransMax is 64, and the packet data convergence protocol (PDCP) discard timer is 300 ms. In this example, the total time to complete the maximum number of SR attempts can be 15.3 seconds, but after 300 ms of not receiving a UL grant, the data for transmission can be expired. In examples described herein, the process of terminating the SR transmission or procedure can be accelerated where the MAC buffer becomes empty so as not to waste time or resources on additional SR transmissions where the UL grant is no longer needed.

The additional SR transmission may have some negative impacts, which may be improved by the concepts described herein. For example, for multi-subscriber identity module (MSIM) devices, if this issue is happening on a non-default data subscription (nDDS), the nDDS may hold the transceiver resource manager (TRM) for a long duration. As nDDS connected-mode discontinuous receive (CDRX) sleep can help to provide the TRM for default data subscription (DDS), this may have impact user performance in DDS. In another example, for devices having high power consumption, after MAC buffer becomes empty, continuing SR transmission may cause periodic SR transmission, which can impact CDRX sleep. Hence, the device may not go for full CDRX sleep, and SR transmission and/or RACH may consume considerable amount of power. In another example, for devices padding transmission, once the MAC buffer becomes, empty even if the devices receives some UL grant also, the device may send only MAC padding with buffer status report (BSR) as 0 to the network, and thus the device may not properly utilize the UL grant. Terminating the SR transmission (or the entire SR procedure) when there is no data to transmit, as described herein, can prevent, or otherwise mitigate the negative effects in such cases. This can also improve device efficiency, power consumption, etc., which can improve user experience in wireless communications using such devices and/or networks.

The described features will be presented in more detail below with reference to FIGS. 1-8.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 340 and UE communicating component 342 for aborting an SR transmission when the UE does not have data to send, in accordance with aspects described herein. Though a UE 104 is shown as having the modem 340 and UE communicating component 342, this is one illustrative example, and substantially any node or type of node may include a modem 340 and UE communicating component 342 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). IoT UEs may include machine type communication (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, in a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.), including base station 102 described above and further herein, may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as virtually distributing functionality for at least one unit, which can enable flexibility in network design. The various units of the disaggregated base station, or disaggregated RAN architecture, can be configured for wired or wireless communication with at least one other unit.

In an example, a UE 104 can communicate with a base station 102 over a DRB, and can receive resources for transmitting SRs to the base station 102 (e.g., PUCCH resources). When the UE 104 has data in a buffer for transmitting to the base station 102, UE communicating component 342 can transmit a SR to the base station 102 to request uplink resources (e.g., an UL grant indicating uplink resources, such as physical uplink shared channel (PUSCH) resource). When the base station 102 properly receives the SR, the base station 102 can transmit an UL grant to the UE 104. In some examples, however, the base station 102 may not properly receive the SR or may otherwise not be able to transmit a UL grant to the UE 104. As such, UE communicating component 342 can transmit the SR as part of a SR procedure that defines periodic transmission of the SR for a maximum number of attempts.

In some examples, however, UE communicating component 342 may expire the data to be transmitted before a UL grant is received from the base station 102. In this example, UE communicating component 342 can terminate an SR transmission in the SR procedure based on detecting that there is no longer data in the buffer to be transmitted to the base station 102. In another example, after a number of terminated or aborted SR transmissions, UE communicating component 342 can release an SR resource for transmitting the SRs and/or may perform a RACH procedure to receive an UL grant from the base station 102 or another base station 102 (or more generally with the network) or synchronize (e.g., in time) uplink communications with the base station 102 or another base station 102, to establish/reestablish a connection with the base station 102 or another base station 102, etc.

Figure 2:
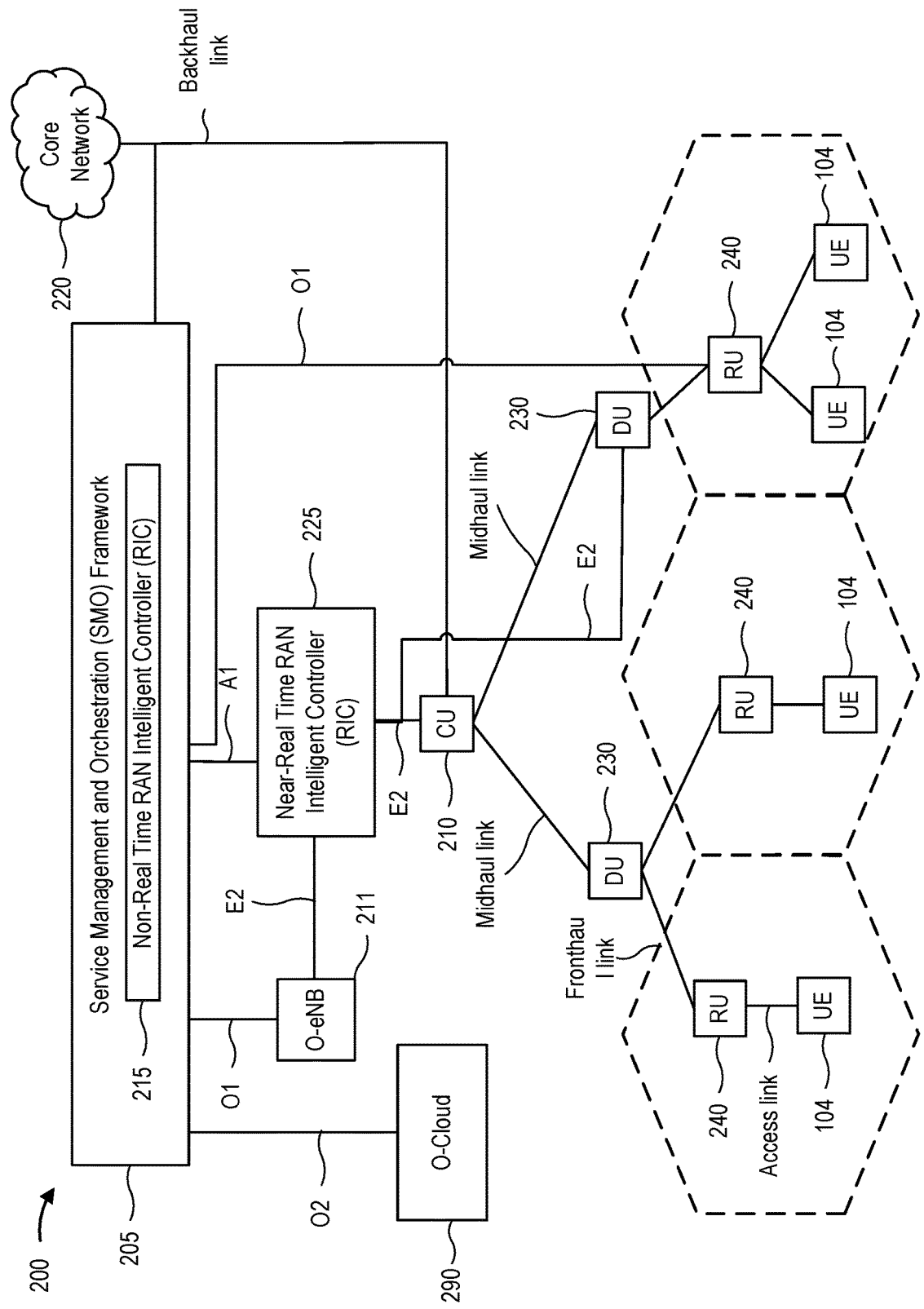
FIG. 2 is a diagram illustrating an example of disaggregated base station architecture, in accordance with various aspects of the present disclosure.

FIG. 2 shows a diagram illustrating an example of disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (MC) 225 via an E2 link, or a Non-Real Time (Non-RT) MC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (i.e., Central Unit-User Plane (CU-UP)), control plane functionality (i.e., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the third Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communication with one or more UEs 104. In some implementations, real-time and non-real-time aspects of control and user plane communication with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Turning now to FIGS. 3-8, aspects are depicted with reference to one or more components and one or more methods that may perform the actions or operations described herein, where aspects in dashed line may be optional. Although the operations described below in FIGS. 4-7 are presented in a particular order and/or as being performed by an example component, it should be understood that the ordering of the actions and the components performing the actions may be varied, depending on the implementation. Moreover, it should be understood that the following actions, functions, and/or described components may be performed by a specially programmed processor, a processor executing specially programmed software or computer-readable media, or by any other combination of a hardware component and/or a software component capable of performing the described actions or functions.

Figure 3:
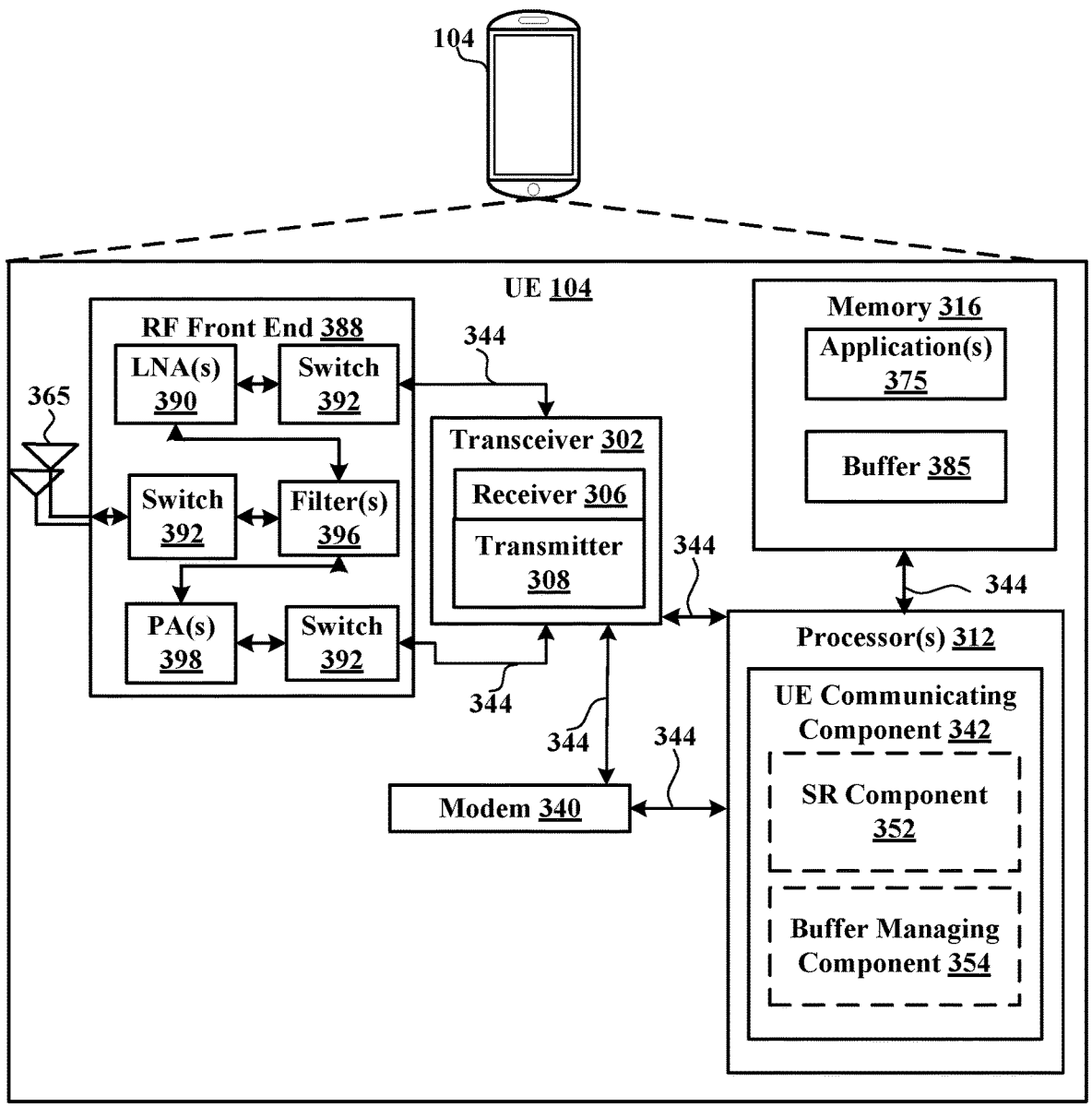
FIG. 3 is a block diagram illustrating an example of a user equipment (UE), in accordance with various aspects of the present disclosure.

Referring to FIG. 3, one example of an implementation of UE 104 may include a variety of components, some of which have already been described above and are described further herein, including components such as one or more processors 312 and memory 316 and transceiver 302 in communication via one or more buses 344, which may operate in conjunction with modem 340 and/or UE communicating component 342 for aborting an SR transmission of an SR procedure (or aborting the SR procedure) when the UE does not have data to send, as described herein.

In an aspect, the one or more processors 312 can include a modem 340 and/or can be part of the modem 340 that uses one or more modem processors. Thus, the various functions related to UE communicating component 342 may be included in modem 340 and/or processors 312 and, in an aspect, can be executed by a single processor, while in other aspects, different ones of the functions may be executed by a combination of two or more different processors. For example, in an aspect, the one or more processors 312 may include any one or any combination of a modem processor, or a baseband processor, or a digital signal processor, or a transmit processor, or a receiver processor, or a transceiver processor associated with transceiver 302. In other aspects, some of the features of the one or more processors 312 and/or modem 340 associated with UE communicating component 342 may be performed by transceiver 302.

Also, memory 316 may be configured to store data used herein and/or local versions of applications 375 or UE communicating component 342 and/or one or more of its subcomponents being executed by at least one processor 312. Memory 316 can include any type of computer-readable medium usable by a computer or at least one processor 312, such as random access memory (RAM), read only memory (ROM), tapes, magnetic discs, optical discs, volatile memory, non-volatile memory, and any combination thereof. In an aspect, for example, memory 316 may be a non-transitory computer-readable storage medium that stores one or more computer-executable codes defining UE communicating component 342 and/or one or more of its subcomponents, and/or data associated therewith, when UE 104 is operating at least one processor 312 to execute UE communicating component 342 and/or one or more of its subcomponents.

Transceiver 302 may include at least one receiver 306 and at least one transmitter 308. Receiver 306 may include hardware and/or software executable by a processor for receiving data, the code comprising instructions and being stored in a memory (e.g., computer-readable medium). Receiver 306 may be, for example, a radio frequency (RF) receiver. In an aspect, receiver 306 may receive signals transmitted by at least one base station 102 or a SL transmitting UE. Additionally, receiver 306 may process such received signals, and also may obtain measurements of the signals, such as, but not limited to, Ec/Io, signal-to-noise ratio (SNR), reference signal received power (RSRP), received signal strength indicator (RSSI), etc. Transmitter 308 may include hardware and/or software executable by a processor for transmitting data, the code comprising instructions and being stored in a memory (e.g., computer-readable medium). A suitable example of transmitter 308 may including, but is not limited to, an RF transmitter.

Moreover, in an aspect, UE 104 may include RF front end 388, which may operate in communication with one or more antennas 365 and transceiver 302 for receiving and transmitting radio transmissions, for example, receiving wireless communications transmitted by at least one base station 102 or a SL transmitting UE, transmitting wireless communications to at least one base station 102 or a SL receiving UE, etc. RF front end 388 may be connected to one or more antennas 365 and can include one or more low-noise amplifiers (LNAs) 390, one or more switches 392, one or more power amplifiers (PAs) 398, and one or more filters 396 for transmitting and receiving RF signals.

In an aspect, LNA 390 can amplify a received signal at a desired output level. In an aspect, each LNA 390 may have a specified minimum and maximum gain values. In an aspect, RF front end 388 may use one or more switches 392 to select a particular LNA 390 and its specified gain value based on a desired gain value for a particular application.

Further, for example, one or more PA(s) 398 may be used by RF front end 388 to amplify a signal for an RF output at a desired output power level. In an aspect, each PA 398 may have specified minimum and maximum gain values. In an aspect, RF front end 388 may use one or more switches 392 to select a particular PA 398 and its specified gain value based on a desired gain value for a particular application.

Also, for example, one or more filters 396 can be used by RF front end 388 to filter a received signal to obtain an input RF signal. Similarly, in an aspect, for example, a respective filter 396 can be used to filter an output from a respective PA 398 to produce an output signal for transmission. In an aspect, each filter 396 can be connected to a specific LNA 390 and/or PA 398. In an aspect, RF front end 388 can use one or more switches 392 to select a transmit or receive path using a specified filter 396, LNA 390, and/or PA 398, based on a configuration as specified by transceiver 302 and/or processor 312.

As such, transceiver 302 may be configured to transmit and receive wireless signals through one or more antennas 365 via RF front end 388. In an aspect, transceiver may be tuned to operate at specified frequencies such that UE 104 can communicate with, for example, one or more base stations 102 or one or more cells associated with one or more base stations 102, one or more other UEs in SL communications, etc. In an aspect, for example, modem 340 can configure transceiver 302 to operate at a specified frequency and power level based on the UE configuration of the UE 104 and the communication protocol used by modem 340.

In an aspect, modem 340 can be a multiband-multimode modem, which can process digital data and communicate with transceiver 302 such that the digital data is sent and received using transceiver 302. In an aspect, modem 340 can be multiband and be configured to support multiple frequency bands for a specific communications protocol. In an aspect, modem 340 can be multimode and be configured to support multiple operating networks and communications protocols. In an aspect, modem 340 can control one or more components of UE 104 (e.g., RF front end 388, transceiver 302) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, memory 316 can include a buffer 385, which can store data for transmitting to a base station. For example, buffer 385 can be a buffer at a PDCP layer that stores data for providing to a lower layer (e.g., a MAC or physical layer) for data unit generation and transmitting to the base station. In an aspect, UE communicating component 342 can optionally include a SR component 352 for performing a SR procedure to transmit one or more SRs to a base station to request a UL grant, and/or a buffer managing component 354 for managing a buffer of the UE 104 (e.g., buffer 385), which may store data for transmission to the base station, as described further herein.

In an aspect, the processor(s) 312 may correspond to one or more of the processors described in connection with the UE in FIG. 8. Similarly, the memory 316 may correspond to the memory described in connection with the UE in FIG. 8.

Figure 4:
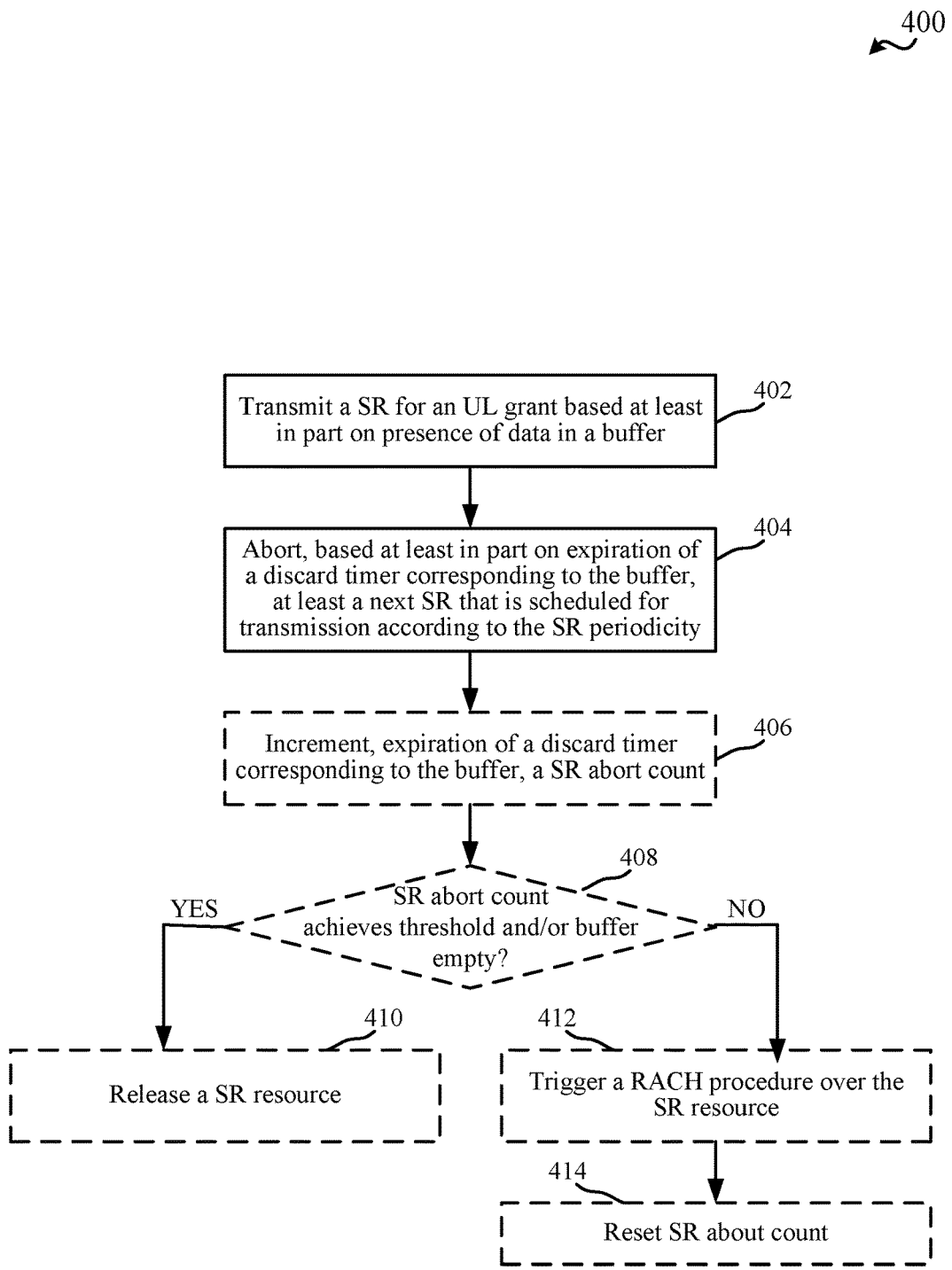
FIG. 4 is a flow chart illustrating an example of a method for aborting one or more scheduling request (SR) transmissions, in accordance with aspects described herein.

FIG. 4 illustrates a flow chart of an example of a method 400 for aborting a SR transmission or procedure, in accordance with aspects described herein. In an example, a UE 104 can perform the functions described in method 400 using one or more of the components described in FIGS. 1 and 3.

In method 400, at Block 402, a SR for an UL grant can be transmitted based at least in part on presence of data in a buffer. In an aspect, SR component 352, e.g., in conjunction with processor(s) 312, memory 316, transceiver 302, UE communicating component 342, etc., can transmit the SR for the UL grant based at least in part on presence of data in the buffer. For example, SR component 352 can detect presence of data in the buffer, such as buffer 385. As described, for example, buffer 385 can store data generated at a PDCP layer for transmitting to a base station, though other buffers may be used in conjunction with aspects described herein as well. The data stored in buffer 385 can be generated by an application (e.g., application 375) executing on the UE 104, and the data may include communications for transmitting to the base station. SR component 352 can detect or be notified of presence of the data, and SR component 352 may accordingly transmit the SR to the base station to request an UL grant for UL resources over which to transmit the data from buffer 385.

In an example, SR component 352 can transmit the SR as part of initiating a SR procedure based on presence of data in the buffer. For example, the SR procedure may include multiple possible SR transmissions defined by one or more parameters of the SR procedure. SR component 352 can transmit an initial SR and/or one or more additional SRs, based on the SR procedure parameters, until an UL grant is received from the base station. As described, for example, the SR parameters can include a SR periodicity for transmitting the SR, and where SR component 352 does not receive an UL grant, it can continue transmitting SRs at a time that is based on the SR periodicity. In another example, the SR parameters can include a prohibit timer (defined in 5G NR as SR-ProhibitTimer) that can define a time from a last SR transmission before the UE 104 is allowed to transmit a next SR transmission, and SR component 352 can transmit multiple SRs, if necessary, based on complying with the prohibit timer. In another example, the SR parameters can include a maximum SR transmission count for the SR procedure (defined in 5G NR as dsr-TransMax), and SR component 352 can transmit multiple SRs, if necessary, until the maximum SR transmission count is reached.

In method 400, at Block 404, at least a next SR that is scheduled for transmission according to the SR periodicity can be aborted based at least in part on expiration of a discard timer corresponding to the buffer. In an aspect, SR component 352, e.g., in conjunction with processor(s) 312, memory 316, transceiver 302, UE communicating component 342, etc., can abort, based at least in part on expiration of the discard timer corresponding to the buffer, at least the next SR that is scheduled for transmission according to the SR periodicity (and/or also based at least in part on the buffer being or becoming empty). For example, buffer managing component 354 can maintain a discard timer for data in buffer 385. In an example, buffer managing component 354 can start the discard timer based on data being stored in buffer 385 (e.g., based on detecting an event of data stored in the buffer 385). If the data is transmitted, buffer managing component 354 can release the data from the buffer 385 and terminate the discard timer. If the discard timer expires without the data being transmitted, however, buffer managing component 354 can release the data from the buffer. At this time, if an UL grant has not been received and the SR procedure continues, any UL grant that may be received from the base station as a result of SR transmission may not be used by the UE 104 as there is no longer data to transmit.

Accordingly, based on expiration of the discard timer, SR component 352 can abort at least a next SR transmission in the SR procedure. For example, SR component 352 can refrain from transmitting at least the next SR to the base station 102. In another example, SR component 352 can terminate the SR procedure altogether, which may be effectuated by aborting each SR transmission remaining in the SR procedure (e.g., multiple remaining SR transmissions in the SR procedure) until the maximum transmission count is reached, canceling a process that manages the SR procedure, releasing the PUCCH resources used for transmitting the SR, or otherwise performing a RACH procedure to reestablish a connection, etc. In an example, SR component 352 can detect expiration of the discard timer based at least in part on receiving an indication of the expiration of the discard timer from buffer managing component 354 or other component or layer that manages the discard timer. In another example, SR component 352 can detect the event of releasing the data from the buffer 385.

In method 400, optionally at Block 406, a SR abort count can be incremented based at least in part on expiration of the discard timer correspond to the buffer. In an aspect, SR component 352, e.g., in conjunction with processor(s) 312, memory 316, transceiver 302, UE communicating component 342, etc., can increment, based at least in part on expiration of the discard timer corresponding to the buffer, at least the next SR that is scheduled for transmission according to the SR periodicity. For example, SR component 352 can manage the abort count in memory 316, and can set the abort count to zero before the SR procedure. Each time the SR component 352 aborts an SR transmission in the SR procedure, SR component 352 can increment the abort count.

In method 400, optionally at Block 408, it can be determined whether the SR abort count achieves a threshold and/or whether the buffer is empty. In an aspect, SR component 352, e.g., in conjunction with processor(s) 312, memory 316, transceiver 302, UE communicating component 342, etc., can determine whether the SR abort count achieves the threshold and/or whether the buffer is empty. If so, optionally at Block 410, a SR resource can be released. In an aspect, SR component 352, e.g., in conjunction with processor(s) 312, memory 316, transceiver 302, UE communicating component 342, etc., can release the SR resource where the SR abort count achieves the threshold and/or where the buffer is empty. For example, SR component 352 can release a PUCCH resource over which the SRs are transmitted. In an example, SR component 352 can release the PUCCH resource at a physical layer by no longer using the PUCCH resource.

If the SR abort count does not achieve threshold and/or where the buffer is not empty at Block 408, optionally at Block 412, a RACH procedure can be triggered over the SR resource. In an aspect, SR component 352, e.g., in conjunction with processor(s) 312, memory 316, transceiver 302, UE communicating component 342, etc., can trigger the RACH procedure over the SR resource where the SR abort count does not achieve the threshold and/or where the buffer is not empty. For example, SR component 352 can transmit a RACH preamble over associated resources to request reestablishment of a connection with the base station 102 or cell. Where the RACH procedure is successful, optionally at Block 414, the SR abort count can be reset. In an aspect, SR component 352, e.g., in conjunction with processor(s) 312, memory 316, transceiver 302, UE communicating component 342, etc., can reset the SR abort count (e.g., to zero) where the RACH procedure succeeds. In this regard, for example, SR component 352 can restart the SR procedure when data arrives in buffer 385.

Figure 5:
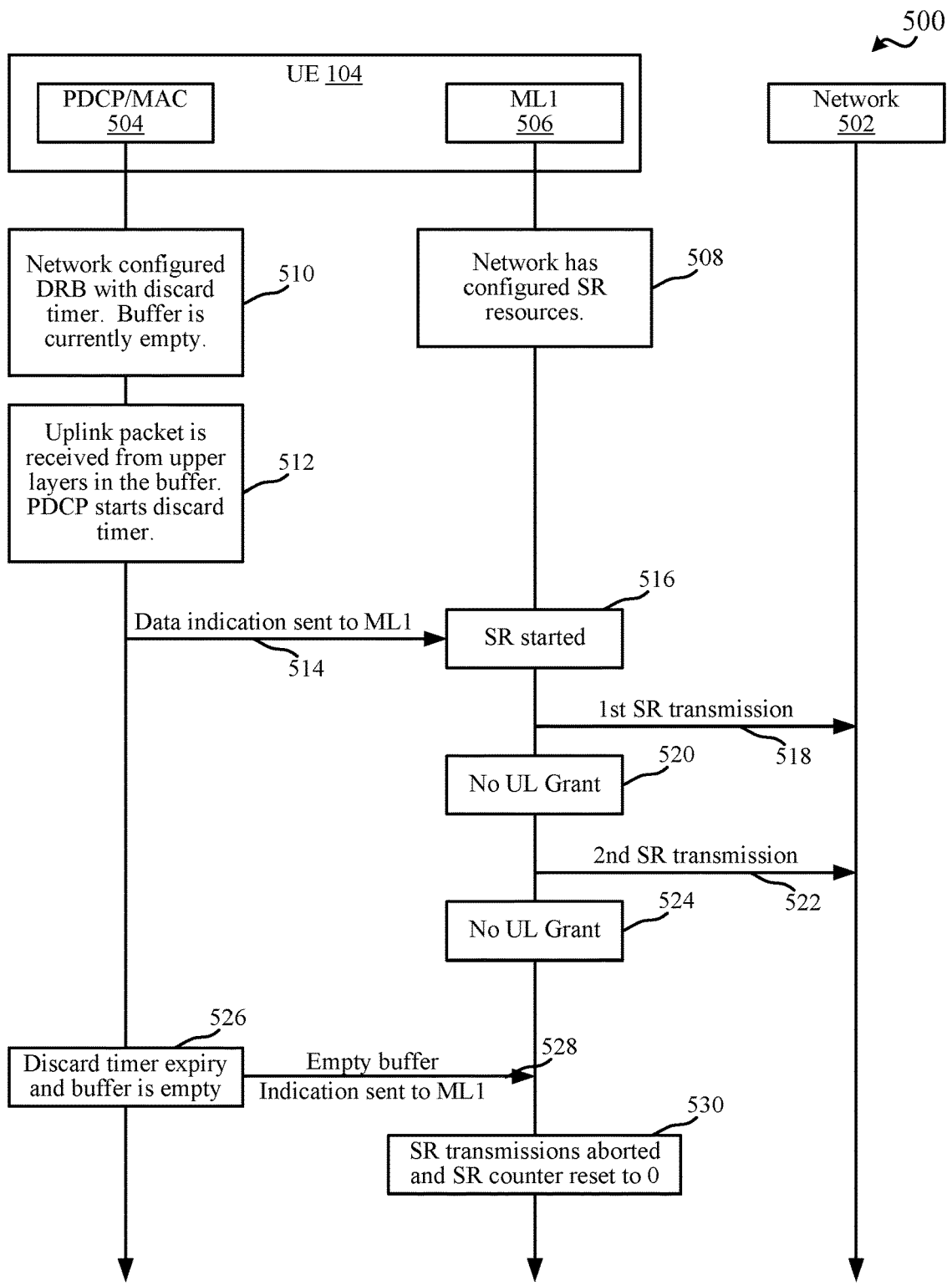
FIG. 5 illustrates an example of a timeline for aborting SR transmissions, in accordance with various aspects of the present disclosure.

FIG. 5 illustrates an example of a timeline 500 for aborting SR transmissions, in accordance with aspects described herein. In timeline 500, a UE 104 can communicate with a network 502. The UE 104 can include a PDCP/MAC layer 504 and a layer 1 (ML1) 506, which can be or include a physical layer. The network 502 can have previously configured SR resources with ML1 506 at 508, which can include a PUCCH over which to transmit the SR(s). The network 502 can have previously configured a DRB with a discard timer with PDCP 504 at 510, and the buffer can be currently empty. At 512, PDCP/MAC 504 can receive an uplink packet from upper layers (e.g., an application), and the PDCP discard timer can be started. Based on receiving the uplink packet, PDCP/MAC 504 can send a data indication to ML1 506 at 514, and ML1 506 can accordingly start the SR procedure at 516. As part of the SR procedure, ML1 506 can transmit a first SR transmission 518 to the network 502 to request a UL grant for transmitting the packet. At 520, ML1 506 can detect that no UL grant is received from the network 502 (e.g., within a threshold time period). Accordingly, as part of the SR procedure, ML1 506 can transmit a second SR transmission 522 (e.g., based on the SR periodicity) to the network 502 to again request a UL grant for transmitting the packet. At 524, ML1 506 can detect that no UL grant is received from the network 502 (e.g., within a threshold time period). Before a next SR is to be transmitted, the discard timer can expire at the PDCP/MAC 504 at 526, and the buffer can be emptied. PDCP/MAC 504 can send an empty buffer indication to ML1 506 at 528. Based on receiving the empty buffer indication, ML1 506 can abort SR transmissions and/or set a SR counter (e.g., SR abort count) to zero at 530.

Figure 6:
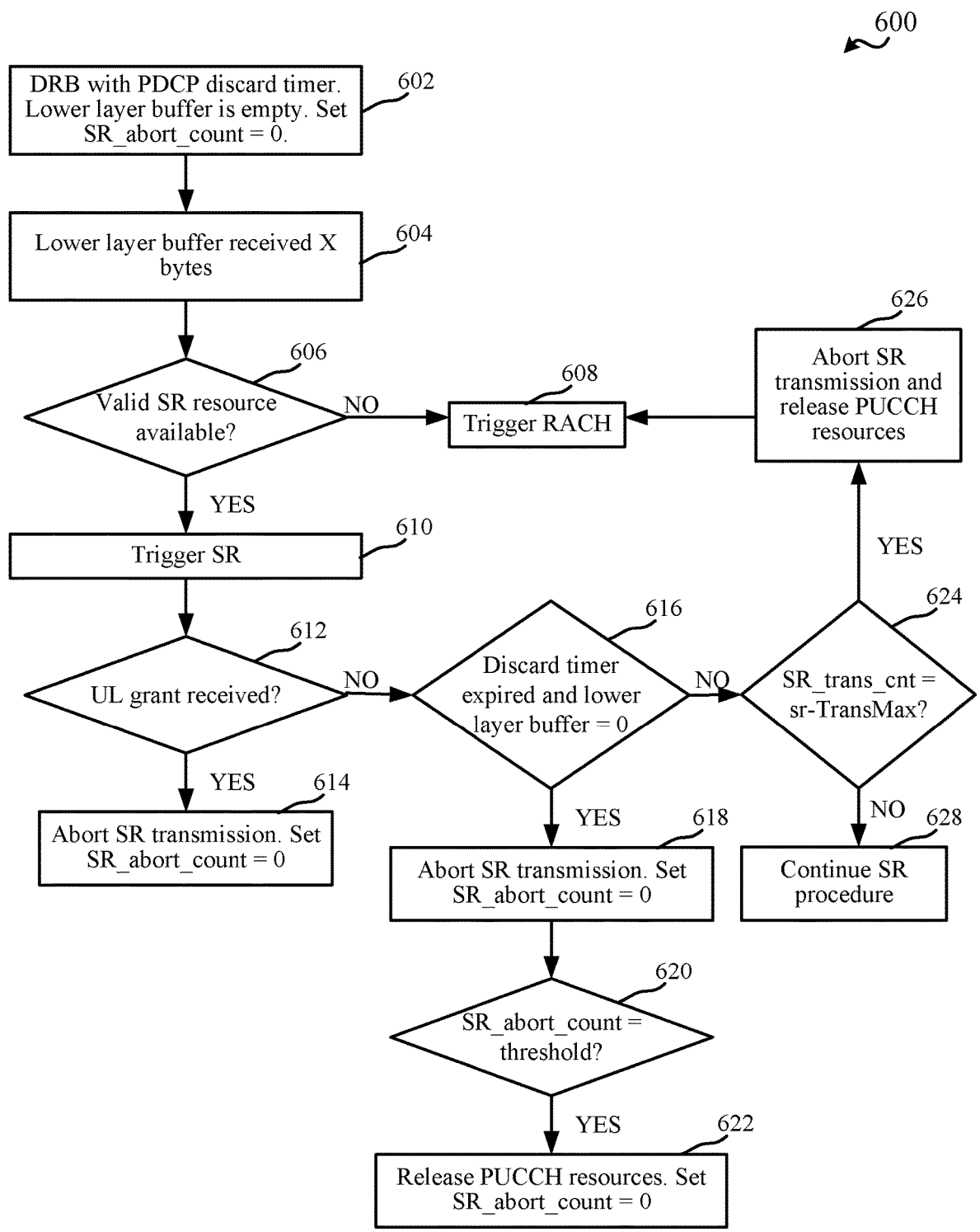
FIG. 6 illustrates an example of a specific process for aborting SR transmissions, in accordance with various aspects of the present disclosure.

FIG. 6 illustrates a non-limiting example of a specific process 600 for aborting SR transmissions, in accordance with aspects described herein. In an example, process 600 can be performed by a UE 104 or one or more components thereof, such as a SR component 352, buffer managing component 354, etc., as described above. At 602, a DRB with a PDCP discard timer can be established (e.g., with a base station 102), a lower layer buffer can be empty, and a SR_abort_count can be set to zero. At 604, the lower layer buffer can receive X bytes, where X can be a positive integer. The X bytes may correspond to a packet to be transmitted to the base station, as described. At 606, it can be determined whether a valid SR resource is available. If not, RACH can be triggered at 608. If there is a valid SR resource available at 606, at 610, SR can be triggered. This can include triggering the SR procedure and/or a SR transmission of the SR procedure. At 612, it can be determined whether a UL grant is received in response to the SR. If so, SR transmission (and/or the SR procedure) can be aborted, and SR_abort_count can be set to zero.

If the UL grant is not received at 612, at 616, it can be determined whether the discard timer is expired and whether the lower layer buffer=0 (e.g., is empty). If so, SR transmission (and/or the SR procedure) can be aborted. In addition, at 620, it can be determined whether the SR_abort_count=a threshold. If so, at 622, the PUCCH resources for SR can be released, and SR_abort_count can be set to zero. If the discard timer is not expired or the lower layer buffer is not empty at 616, at 624, it can be determined whether the SR transmission count is equal to the maximum SR transmission count (sr-TransMax) defined for the SR procedure. If so, at 626, the SR transmission can be aborted and the PUCCH resources can be released, and RACH can be triggered at 608. If the SR transmission count is not equal to the maximum SR transmission count at 626, the SR procedure can continue at 628.

The following is an example of pseudo code for an example of a process in accordance with aspects described herein and in FIG. 6:

```
Step 1 : SR_abort_count = 0. Threshold can be a configurable value.
Step 2 : After getting data in buffer,
    If ( Valid SR Resource available )
        Trigger SR
    else
        Trigger Rach
Step 3 :
    If ( Discard timer expired and lower layer buffer == 0)
        Abort SR transmission
        SR_abort_count ++
    elseif ( SR_abort_count == Threshold)
        Release SR resource and set SR_abort_count =0
    else
        Continue SR procedure
```

Figure 7:
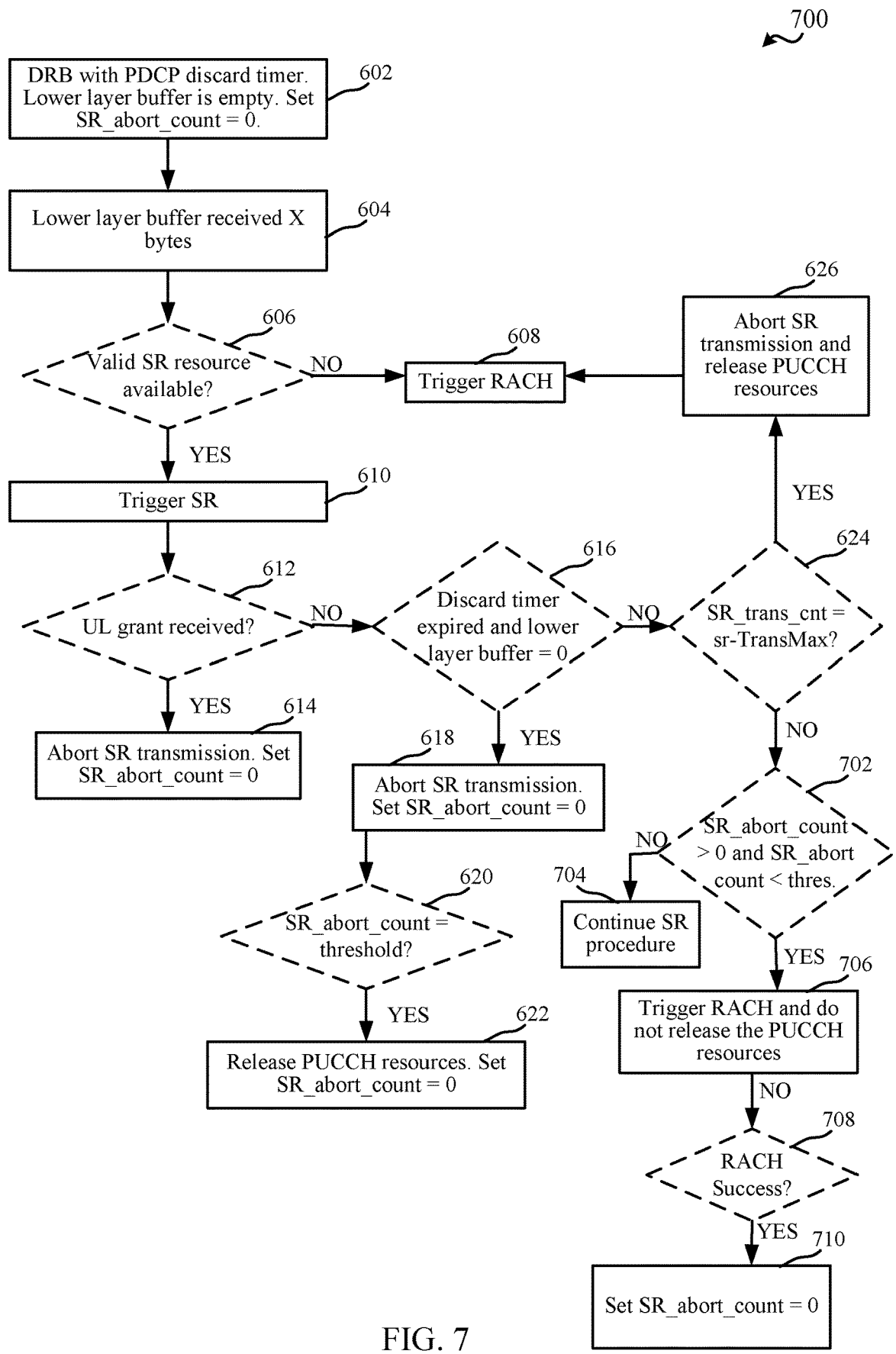
FIG. 7 illustrates an example of a specific process for aborting SR transmissions without necessarily releasing the uplink resources, in accordance with various aspects of the present disclosure.

FIG. 7 illustrates a non-limiting example of a specific process 700 for aborting SR transmissions without necessarily releasing the PUCCH resources, in accordance with aspects described herein. In an example, process 700 can be performed by a UE 104 or one or more components thereof, such as a SR component 352, buffer managing component 354, etc., as described above. In addition, process 700 can include the actions of process 600, including 602, 604, 606, 608, 610, 612, 614, 616, 618, 620, 622, 624, and 626. If the SR transmission count is not equal to the maximum SR transmission count at 626, at 702, it can be determined whether the SR_abort_count is greater than zero and is less than the threshold. If not, at 704, the SR procedure can be continued. If the SR_abort_count is greater than zero and is less than the threshold, at 706, RACH can be triggered, but the PUCCH resources are not released. This can allow the UE to request RACH over the resources at each scheduled SR transmission until the maximum number of SR transmissions is reached. At 708, it can be determined whether the RACH succeeds, and if so, at 710, SR_abort_count can be set to zero.

As multiple SR transmission failure may be because of time misalignment, performing the RACH may help to synchronize the uplink communications. The following is an example of pseudo code for an example of a process in accordance with aspects described herein and in FIG. 7:

```
Step 1 : SR_abort_count = 0. Threshold can be a configurable value.
Step 2 : After getting data in buffer,
    If ( Valid SR Resource available )
                Trigger SR
    else
                Trigger Rach
Step 3 :            If ( Discard timer expired and lower layer buffer == 0)
    Abort SR transmission
    SR_abort_count ++
    elseif ( SR_abort_count == Threshold)
        Release SR resource and set SR_abort_count =0
    elseif ( SR_abort_count > 0 && SR_abort_count < Threshold && lower
layer buffer != 0)
        Trigger a Rach without releasing the PUCCH resources
                if ( RACH success)
                    set SR_abort_count = 0
    else
        Continue SR procedure
```

Aspects described herein can help to gracefully handle the SR transmission once the buffer (e.g., buffer 385, which may be a buffer at the MAC or PDCP layer) becomes empty. As these aspects can help to avoid unwanted SR, so it can help to save more power by avoiding SR and RACH transmission. In addition, in some examples, the aspects can help the UE to go for CDRX sleep, which can help the DDS subscription to get resource from nDDS subscription. With the aspects described herein, both power and performance can be improved, as described.

Figure 8:
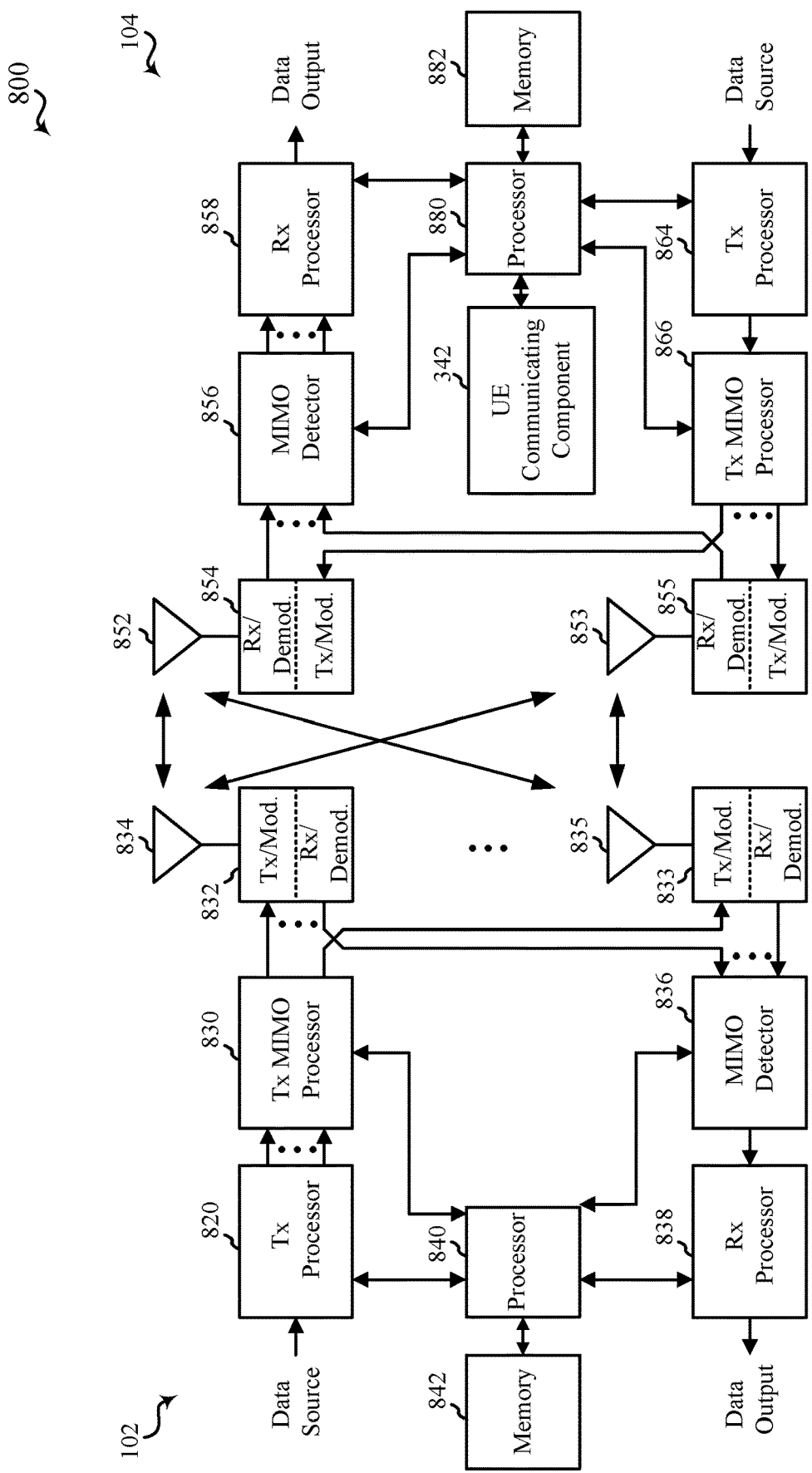
FIG. 8 is a block diagram illustrating an example of a multiple-input multiple-output (MIMO) communication system including a base station and a UE, in accordance with various aspects of the present disclosure.

FIG. 8 is a block diagram of a MIMO communication system 800 including a base station 102 and a UE 104. The MIMO communication system 800 may illustrate aspects of the wireless communication access network 100 described with reference to FIG. 1. The base station 102 may be an example of aspects of the base station 102 described with reference to FIG. 1. The base station 102 may be equipped with antennas 834 and 835, and the UE 104 may be equipped with antennas 852 and 853. In the MIMO communication system 800, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 820 may receive data from a data source. The transmit processor 820 may process the data. The transmit processor 820 may also generate control symbols or reference symbols. A transmit MIMO processor 830 may perform spatial processing (e.g., precoding) on data symbols, control symbols, or reference symbols, if applicable, and may provide output symbol streams to the transmit modulator/demodulators 832 and 833. Each modulator/demodulator 832 through 833 may process a respective output symbol stream (e.g., for OFDM, etc.) to obtain an output sample stream. Each modulator/demodulator 832 through 833 may further process (e.g., convert to analog, amplify, filter, and upconvert) the output sample stream to obtain a DL signal. In one example, DL signals from modulator/demodulators 832 and 833 may be transmitted via the antennas 834 and 835, respectively.

The UE 104 may be an example of aspects of the UEs 104 described with reference to FIGS. 1-2. At the UE 104, the UE antennas 852 and 853 may receive the DL signals from the base station 102 and may provide the received signals to the modulator/demodulators 854 and 855, respectively. Each modulator/demodulator 854 through 855 may condition (e.g., filter, amplify, downconvert, and digitize) a respective received signal to obtain input samples. Each modulator/demodulator 854 through 855 may further process the input samples (e.g., for OFDM, etc.) to obtain received symbols. A MIMO detector 856 may obtain received symbols from the modulator/demodulators 854 and 855, perform MIMO detection on the received symbols, if applicable, and provide detected symbols. A receive (Rx) processor 858 may process (e.g., demodulate, deinterleave, and decode) the detected symbols, providing decoded data for the UE 104 to a data output, and provide decoded control information to a processor 880, or memory 882.

The processor 880 may in some cases execute stored instructions to instantiate a UE communicating component 342 (see e.g., FIGS. 1 and 2).

On the uplink (UL), at the UE 104, a transmit processor 864 may receive and process data from a data source. The transmit processor 864 may also generate reference symbols for a reference signal. The symbols from the transmit processor 864 may be precoded by a transmit MIMO processor 866 if applicable, further processed by the modulator/demodulators 854 and 855 (e.g., for SC-FDMA, etc.), and be transmitted to the base station 102 in accordance with the communication parameters received from the base station 102. At the base station 102, the UL signals from the UE 104 may be received by the antennas 834 and 835, processed by the modulator/demodulators 832 and 833, detected by a MIMO detector 836 if applicable, and further processed by a receive processor 838. The receive processor 838 may provide decoded data to a data output and to the processor 840 or memory 842.

The components of the UE 104 may, individually or collectively, be implemented with one or more ASICs adapted to perform some or all of the applicable functions in hardware. Each of the noted modules may be a means for performing one or more functions related to operation of the MIMO communication system 800. Similarly, the components of the base station 102 may, individually or collectively, be implemented with one or more application specific integrated circuits (ASICs) adapted to perform some or all of the applicable functions in hardware. Each of the noted components may be a means for performing one or more functions related to operation of the MIMO communication system 800.

The following aspects are illustrative only and aspects thereof may be combined with aspects of other embodiments or teaching described herein, without limitation.

Aspect 1 is a method for wireless communication including transmitting a SR for an uplink grant based at least in part on presence of data in a buffer, wherein the SR is scheduled for transmission according to a SR periodicity, and aborting, based at least in part on expiration of a discard timer corresponding to the buffer, at least a next SR that is scheduled for transmission according to the SR periodicity.

In Aspect 2, the method of Aspect 1 includes where aborting at least the next SR is further based at least in part on detecting that the buffer is empty following expiration of the discard timer.

In Aspect 3, the method of any of Aspects 1 or 2 includes where at least the next SR is included in an SR procedure of multiple SRs scheduled according to the SR periodicity, and aborting, based at least in part on detecting that the buffer is empty following expiration of the discard timer, remaining SRs of the multiple SRs.

In Aspect 4, the method of any of Aspects 1 to 3 includes incrementing, based at least in part on expiration of the discard timer, a SR abort count, and releasing a SR resource where the SR abort count achieves a threshold.

In Aspect 5, the method of Aspect 4 includes resetting, based on releasing the SR resource, the SR abort count.

In Aspect 6, the method of any of Aspects 1 to 5 includes where the next SR is within a maximum SR transmission count.

In Aspect 7, the method of any of Aspects 1 to 6 includes incrementing, based at least in part on expiration of the discard timer, a SR abort count, and triggering a random access channel (RACH) procedure without releasing a SR resource where the SR abort count is greater than zero and does not achieve a threshold.

In Aspect 8, the method of Aspect 7 includes where triggering the RACH procedure without releasing the SR resource is further where the SR abort count has been incremented and where the buffer is not empty.

In Aspect 9, the method of any of Aspects 7 or 8 includes resetting the SR abort count where the RACH procedure succeeds.

Aspect 10 is an apparatus for wireless communication including a transceiver, a memory configured to store instructions, and one or more processors communicatively coupled with the memory and the transceiver, wherein the one or more processors are configured to perform one or more of the methods of any of Aspects 1 to 9.

Aspect 11 is an apparatus for wireless communication including means for performing one or more of the methods of any of Aspects 1 to 9.

Aspect 12 is a computer-readable medium including code executable by one or more processors for wireless communications, the code including code for performing one or more of the methods of any of Aspects 1 to 9.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially programmed processor may be a microprocessor, but in the alternative, the processor may be any conventional processor, controller, microcontroller, or state machine. A specially programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. An apparatus for wireless communication, comprising:
   a transceiver;
   a memory configured to store instructions; and
   one or more processors communicatively coupled with the transceiver and the memory, wherein the one or more processors are configured to:
      start, based on detecting an event of data being stored in a buffer, a discard timer based on expiration of which the data is to be released from the buffer;
      transmit a scheduling request (SR) for an uplink grant based at least in part on presence of the data in the buffer, wherein the SR is scheduled for transmission according to a SR periodicity; and
      abort, based at least in part on the expiration of the discard timer, at least a next SR that is scheduled for transmission according to the SR periodicity, wherein the data is released from the buffer based on the expiration of the discard timer.

2. The apparatus of claim 1, wherein the one or more processors are configured to abort at least the next SR further based at least in part on detecting that the buffer is empty following the expiration of the discard timer.

3. The apparatus of claim 1, wherein at least the next SR is included in an SR procedure of multiple SRs scheduled according to the SR periodicity, and wherein the one or more processors are further configured to abort, based at least in part on detecting that the buffer is empty following the expiration of the discard timer, one or more remaining SRs of the multiple SRs.

4. The apparatus of claim 1, wherein the one or more processors are further configured to:
   increment, based at least in part on the expiration of the discard timer, a SR abort count; and
   release a SR resource where the SR abort count achieves a threshold.

5. The apparatus of claim 4, wherein the one or more processors are further configured to reset, based on releasing the SR resource, the SR abort count.

6. The apparatus of claim 1, wherein the next SR is within a maximum SR transmission count.

7. The apparatus of claim 1, wherein the one or more processors are further configured to:
   increment, based at least in part on the expiration of the discard timer, a SR abort count; and
   trigger a random access channel (RACH) procedure without releasing a SR resource where the SR abort count is greater than zero and does not achieve a threshold.

8. The apparatus of claim 7, wherein the one or more processors are configured to trigger the RACH procedure without releasing the SR resource where the SR abort count has been incremented and where the buffer is not empty.

9. The apparatus of claim 7, wherein the one or more processors are further configured to reset the SR abort count where the RACH procedure succeeds.

10. A method for wireless communication, comprising:
    starting, based on detecting an event of data being stored in a buffer, a discard timer based on expiration of which the data is to be released from the buffer;
    transmitting a scheduling request (SR) for an uplink grant based at least in part on presence of the data in the buffer, wherein the SR is scheduled for transmission according to a SR periodicity; and
    aborting, based at least in part on the expiration of the discard timer, at least a next SR that is scheduled for transmission according to the SR periodicity, wherein the data is released from the buffer based on the expiration of the discard timer.

11. The method of claim 10, wherein aborting at least the next SR is further based at least in part on detecting that the buffer is empty following the expiration of the discard timer.

12. The method of claim 10, wherein at least the next SR is included in an SR procedure of multiple SRs scheduled according to the SR periodicity, and further comprising aborting, based at least in part on detecting that the buffer is empty following the expiration of the discard timer, one or more remaining SRs of the multiple SRs.

13. The method of claim 10, further comprising:
incrementing, based at least in part on the expiration of the discard timer, a SR abort count; and
releasing a SR resource where the SR abort count achieves a threshold.

14. The method of claim 13, further comprising resetting, based on releasing the SR resource, the SR abort count.

15. The method of claim 10, wherein the next SR is within a maximum SR transmission count.

16. The method of claim 10, further comprising:
incrementing, based at least in part on the expiration of the discard timer, a SR abort count; and
triggering a random access channel (RACH) procedure without releasing a SR resource where the SR abort count is greater than zero and does not achieve a threshold.

17. The method of claim 16, wherein triggering the RACH procedure without releasing the SR resource is where the SR abort count has been incremented and where the buffer is not empty.

18. The method of claim 16, further comprising resetting the SR abort count where the RACH procedure succeeds.

19. An apparatus for wireless communication, comprising:
means for starting, based on detecting an event of data being stored in a buffer, a discard timer based on expiration of which the data is to be released from the buffer;
means for transmitting a scheduling request (SR) for an uplink grant based at least in part on presence of the data in the buffer, wherein the SR is scheduled for transmission according to a SR periodicity; and
means for aborting, based at least in part on the expiration of the discard timer, at least a next SR that is scheduled for transmission according to the SR periodicity, wherein the data is released from the buffer based on the expiration of the discard timer.

20. The apparatus of claim 19, wherein the means for aborting aborts at least the next SR is further based at least in part on detecting that the buffer is empty following the expiration of the discard timer.

21. The apparatus of claim 19, wherein at least the next SR is included in an SR procedure of multiple SRs scheduled according to the SR periodicity, and further comprising means for aborting, based at least in part on detecting that the buffer is empty following the expiration of the discard timer, one or more remaining SRs of the multiple SRs.

22. The apparatus of claim 19, further comprising:
means for incrementing, based at least in part on the expiration of the discard timer, a SR abort count; and
means for releasing a SR resource where the SR abort count achieves a threshold.

23. The apparatus of claim 22, further comprising means for resetting, based on releasing the SR resource, the SR abort count.

24. The apparatus of claim 19, wherein the next SR is within a maximum SR transmission count.

25. A non-transitory computer-readable medium, comprising code executable by one or more processors for wireless communications, the code comprising code for:
starting, based on detecting an event of data being stored in a buffer, a discard timer based on expiration of which the data is to be released from the buffer;
transmitting a scheduling request (SR) for an uplink grant based at least in part on presence of the data in the buffer, wherein the SR is scheduled for transmission according to a SR periodicity; and
aborting, based at least in part on expiration of the discard timer, at least a next SR that is scheduled for transmission according to the SR periodicity, wherein the data is released from the buffer based on the expiration of the discard timer.

26. The non-transitory computer-readable medium of claim 25, wherein the code for aborting aborts at least the next SR is further based at least in part on detecting that the buffer is empty following the expiration of the discard timer.

27. The non-transitory computer-readable medium of claim 25, wherein at least the next SR is included in an SR procedure of multiple SRs scheduled according to the SR periodicity, and further comprising code for aborting, based at least in part on detecting that the buffer is empty following the expiration of the discard timer, one or more remaining SRs of the multiple SRs.

28. The non-transitory computer-readable medium of claim 25, further comprising: code for incrementing, based at least in part on the expiration of the discard timer, a SR abort count; and code for releasing a SR resource where the SR abort count achieves a threshold.

29. The non-transitory computer-readable medium of claim 28, further comprising code for resetting, based on releasing the SR resource, the SR abort count.

30. The non-transitory computer-readable medium of claim 25, wherein the next SR is within a maximum SR transmission count.

* * * * *